United States Patent [19]
Obata et al.

[11] Patent Number: 5,310,356
[45] Date of Patent: May 10, 1994

[54] TRANSMISSION DEVICE USED BETWEEN TWO RELATIVELY ROTATABLE COMPONENTS

[75] Inventors: Ken Obata; Seiichi Ueno; Masahiro Hasegawa, all of Tokyo, Japan

[73] Assignee: The Furukawa Electric Co., Ltd., Tokyo, Japan

[21] Appl. No.: 18,877

[22] Filed: Feb. 17, 1993

[30] Foreign Application Priority Data

Feb. 20, 1992 [JP] Japan .................................. 4-69385

[51] Int. Cl.⁵ .............................................. H01R 39/02
[52] U.S. Cl. ...................................... 439/164; 439/15
[58] Field of Search ............................ 439/15, 169

[56] References Cited

U.S. PATENT DOCUMENTS 3,597,721 8/1971 Mangan ............................ 439/164
5,149,273 9/1992 Bannai et al. .................... 439/164 X

FOREIGN PATENT DOCUMENTS 751684 2/1953 Fed. Rep. of Germany ...... 439/164
856982 8/1940 France .............................. 439/164

*Primary Examiner*—Eugene F. Desmond
*Attorney, Agent, or Firm*—Frishauf, Holtz, Goodman & Woodward

[57] ABSTRACT

A transmission device is equipped with a flat cable (11) which has a winding direction reversal section (11a) at the middle, and three dummy cables (21A through 21C) which are wrapped over the flat cable, the winding direction reversal sections (11a and 21a through 21c) of the flat cable and dummy cables being arranged in the circumferential direction at approximately equal intervals. The winding direction reversal sections which produce elastic reaction forces are distributed in the circumferential direction at approximately equal intervals, and hence the slack of the flat cable is suppressed when an inner case or an outer case performs reciprocal rotation, thus securely preventing troubles caused by the slack in the flat cable, whereby the possible case revolution number can be increased with a shorter flat cable, and the operation stability of the transmission device can be improved.

19 Claims, 13 Drawing Sheets

TRANSMISSION DEVICE USED BETWEEN TWO RELATIVELY ROTATABLE COMPONENTS

BACKGROUND OF THE INVENTION

The present invention relates to a transmission device designed to transmit electrical signals, optical signals, electric power or the like between two relatively rotatable components via a transmission medium provided between inner and outer cases respectively associated with these two components, and more particularly, to a transmission device which makes it possible to increase the possible relative revolution number of the two components without using a longer transmission medium, features high operation reliability, and permits reduction in size.

Conventionally, the signal transmission between two relatively rotatable components, e.g., an automotive steering shaft component as a rotary component and a steering column component as a stationary component, is performed using a rotary connector, that is, a transmission device provided with a spirally wound, flexible flat cable (hereinafter referred to as FFC) and inner and outer cases for receiving it (Japanese provisional utility model publication no. 62-168581). Here, the FFC refers to a band flexible transmission line such as a cable, which comprises a plurality of electric conductors arranged in parallel to each other and coated with an insulating material, or an optical fiber cable which comprises a plurality of optical fibers arranged in parallel and covered with a sheath.

In this type of transmission device both ends of the FFC are fixed to the inner case and the outer case, respectively, so that the FFC is wound or unwound as the two cases rotate relatively to each other. Accordingly, signal transmission between the rotary component and the stationary component can be performed, with the FFC wound or unwound, even while the rotary component, attached to, e.g., the inner case, rotates relative to the stationary component on which the outer case is mounted. For instance, it becomes possible to transmit a horn signal or auto drive signal received from a switch provided on the steering wheel side of a car to a controller or the like on the car body side via a steering column, or to electrically connect an impact sensor and diagnosis unit provided on the car body side of the car equipped with an air bag system to an inflater of the air bag of the steering wheel side.

The applications of the transmission device described above are limited to those wherein the rotary component performs reciprocal rotation, that is, the rotary component alternately revolves clockwise and counterclockwise, relative to the stationary component. This type of transmission device, however, has an advantage in that the absence of slide-contact parts such as a brush and slip ring ensures no noises for signals. It is because such noises would be caused by the sliding motion of a slide-contact part, or by instantaneous interruption of the signals arising from mechanical vibration of the slide-contact part. Therefore, it becomes possible to configure a highly reliable transmission line. On the other hand, the possible number of relative revolutions of the inner case and the outer case is subject to the number of windings of the FFC. Therefore to increase the possible number of revolutions, the number of windings of the FFC must be increased, i.e., the length of the FFC must be increased. As the number of the windings of the FFC is increased, however, it becomes more difficult to transmit the rotary force of the rotary component to the entire FFC, frequently leading to such trouble as uneven movement of the entire FFC when the rotary component turns and the reversing of the FFC which may do harm to the FFC itself: tearing off ultimately.

In the past, therefore, a transmission device was proposed wherein the FFC is arranged so that the winding direction of the FFC on the inner case side is opposite from that on the outer case side, and a U-turn section is formed in the middle of the FFC in order to make it possible to increase the possible number of relative revolutions of the inner and outer cases with a minimum number of windings of the FFC. According to the proposed device, when the inner case is rotated in such a direction relative to the fixed outer case that the FFC is taken up by the inner case as the inner case turns, the U-turn section of the FFC moves around the inner case in the same direction as the rotational direction of the inner case, and the movement of the U-turn section half offsets the rotation of the inner case. In addition, the rotary force of the inner case can be well transmitted to the whole FFC thus permitting the increase of the possible number of revolutions with a minimum number of windings of the FFC.

If, however, the inner case is rotated in the opposite direction from that described above, that is, if the inner case is turned in the direction so that the FFC is unwound from the inner case as the inner case rotates, then the FFC develops a slack, which interferes with the U-turn section smoothly moving in the case-rotating direction. This causes a moving U-turn section to fail to adequately offset the rotation of the case and to sufficiently transmit the rotary force.

Thus, the proposed device discussed above has the disadvantage that, in some direction of the case, the U-turn section fails to move smoothly, disabling the intended effect of increasing the number of case revolutions with a minimized number of windings of the FFC. Further, the proposed device also requires that the case perform reciprocal rotation; therefore, the case must inevitably be turned also in the direction which inconveniences smooth movement of the U-turn section. For this reason, the proposed device has not yet been put into practical use.

Furthermore, the proposed transmission device described above bears a problem in that it is difficult to reduce the size of the device. More specifically, to ensure smooth movement of the U-turn section and smooth winding and unwinding of the FFC, the volume of the FFC receiving space formed by the inner case and the outer case should be set to approximately double the FFC occupying volume which is defined by the length, width and thickness of the FFC. This is because, for instance, if the FFC housing or accepting space volume is too small and the bending or curvature radius of the FFC at the U-turn section is too small, then an excessive stress is applied to the FFC when the U-turn section moves. This causes the electric conductors, optical fibers, etc. constituting the FFC to break off soon, resulting in a shorter service life of the transmission device.

Especially when external equipment to be connected via a transmission circuit has many circuits, the number of the transmission lines constituting the FFC has to be increased with a consequent increase in the width of the FFC. Accordingly, the cases of the transmission device become larger, requiring a larger space for mounting it on a vehicle or the like. Furthermore, the FFC housing space is exclusively used for housing/accepting the FFC. and no components other than the FFC can be placed in the FFC housing/accepting space, making it half a dead space. Additionally, as the width of the FFC increases, an offensive noise produced when the FFC winds or unwinds tends to become larger. For the reasons described above, it is desired that the FFC housing/accepting space be made smaller.

OBJECT AND SUMMARY OF THE INVENTION

An object of the present invention is to provide a transmission device used between two components adapted to be rotatable relative to each other, which transmission device is capable of securely preventing a slack in a transmission medium caused by the relative rotation of inner and outer cases regardless of the direction of the relative rotation of the cases, thus ensuring high operation reliability, while enjoying an advantage of a transmission device with a transmission medium installed so that a U-turn section is formed in the middle of the transmission medium in that the number of relative revolutions of the inner and outer cases can be increased even when a short transmission medium is used.

Another object of the present invention is to provide a transmission device which makes it possible to reduce the size of a transmission medium housing space, thus permitting reduction in the size of the whole device without sacrificing the life of the transmission medium and the operation reliability of the device.

Still another object of the present invention is to provide a transmission device which features a simple construction and less parts and which is therefore inexpensive.

According to the present invention, a transmission device to be used between two components adapted to be rotatable relative to each other, is provided. The transmission device has an inner case and an outer case, which are associated with the two relatively rotatable components and which are installed so as to be rotatable relative to each other, and a transmission medium which is provided in a wound state between the two cases. In this transmission device, a plurality of cables are provided between the inner case and the outer case, the cables including at least one transmission cable as the transmission medium. Each cable has its inner end and outer end fixed to the inner and outer cases, respectively, an inner end section and outer end section which normally extend in the opposite directions from each other in the circumferential direction of the inner and outer cases so that a section of direction reversal at which the cable extending direction is reversed is formed between the inner and outer end sections. The direction reversal sections of the plurality of cables are spaced at intervals in the circumferential direction of the inner and outer cases.

When an inner case having a drum section and an outer case having a cylindrical section which is provided coaxially with the drum section of the inner case are used in combination with a plurality of cables, the plurality of cables are preferably arranged so that their inner end sections are wound on the drum section of the inner case in a manner that they overlap each other, while the outer end sections extend along the inner circumferential surface of the cylindrical section of the outer case in a manner that they overlap each other, as the two components rotate relative to each other. When an inner case made of e.g., a plate-type component is used in combination with a plurality of cables, the plurality of cables are preferably arranged so that their inner end sections are wound and overlapped each other while their outer end sections are wound and overlapped each other. More preferably, each of the plurality of cables is flexible and the direction reversal section of each cable generates an elastic reaction force for pressing the inner end section of a corresponding one or ones of the plurality of cables, and an elastic reaction force for pressing the outer end section of a corresponding one or ones of the plurality of cables.

The plurality of cables according to the present invention are configured in diverse forms. Preferably the plurality of cables include at least one dummy cable. Alternatively, all the cables may be transmission cables. The transmission cable comprises a band transmission cable including a plurality of transmission lines or a single covered transmission line. When the plurality of cables are configured to include a plurality of transmission cables each comprising a single covered transmission line, these cables may be put together into a single bundle at both ends while they may be separated from each other in the remaining section. Further, when the plurality of cables are configured to include a plurality of transmission cables each comprising a single bare transmits line and a plurality of insulated cables each comprising an insulating material, each of the insulated cables is interposed between counterpart conductors of the transmission cables.

For the connection between the transmission device of the present invention and external equipment, the transmission device preferably includes a plurality of inside connecting terminals, which are provided in the inner case to connect the transmission cables to the external equipment on the inner case side, and a plurality of outside connecting terminals, which are provided in the outer case to connect the transmission cables to the external equipment on the outer case side. The inner end of each transmission cable is connected to a corresponding one or counterpart of the inside connecting terminals, while the outer end of each transmission cable is connected to a corresponding one or counterpart of the outside connecting terminals.

The transmission device of the present invention is configured in various ways to connect the transmission cables to external equipment via the connecting terminals. For instance, the plurality of inside connecting terminals are assembled or integrated at a predetermined part of the inner case, to form an inside connector member for connecting the transmission cables to the external equipment on the inner case side, while the plurality of outside connecting terminals are gathered or integrated at a predetermined part of the outer case, to form an outside connector member for connecting the transmission cables to the external equipment on the outer case side. Alternatively, the plurality of inside connecting terminals are spaced at intervals in the circumferential direction of the inner case, while the plurality of outside connecting terminals are spaced at intervals in the circumferential direction of the outer case. In the latter configuration, a plurality of inside wires may be formed in the inner case, and a plurality of outside wires may be formed in the outer case. In this case, the plurality of inside wires are provided so that their ends on one side are connected to the plurality of inside connecting terminals while their ends on the other side are gathered to be connected to the external equipment on the inner case side. Also, the plurality of outside wires are arranged so that their ends on one side are connected to the plurality of outside connecting terminals while their ends on the other side are gathered to be connected to the external equipment on the outer case side.

Further, a plurality of inner slits into which the inner ends of the plurality of cables are inserted may be formed in the drum section of the inner case and a plurality of outer slits into which the outer ends of the plurality of cables are inserted may be formed in the cylindrical section of the outer case. In this embodiment, preferably, grooves for receiving bent parts of the cables, formed at the outer ends or inner ends of the cables when the two components begin further relative rotation from their ultimate relative rotation position or from their neutral relative rotation position, are formed in the vicinity of the areas where the slits are formed in the drum section of the inner case and the cylindrical section of the outer case.

A major advantage of the transmission device according to the present invention is that improved operation reliability and downsizing of the device can be achieved by providing a plurality of cables including one or more transmission cables with the direction reversal sections of the cables spaced at intervals in the circumferential direction. Another advantage of the present invention is that it is possible to provide a transmission device which is capable of adapting itself to operating environments by selecting a proper cable configuration according to the operating environment including the required number of circuits and the size of the installing space of the transmission device.

Specifically, the elastic reaction force generated by the direction reversal sections of the plurality of cables causes the inner end sections and the outer end sections of the cables to be pressed inward or outward, respectively, in the radial direction of the inner and outer cases at a plurality of points in the circumferential directions of the cases, thereby securely preventing the cables from slacking. In comparison with a conventional transmission device which uses a band transmission cable which includes transmission lines whose number corresponds to the required number of transmission circuits, the transmission device according to the present invention has a plurality of transmission cables to share the required number of circuits, thus making it possible to significantly reduce the number of transmission lines constituting each transmission cable, that is, the width of each transmission cable, thereby permitting a reduced volume of the space for receiving the transmission cables. As a result, the device can be made smaller.

According to the present invention, the arrangement of a transmission device can be made simpler and the number of its components can be reduced: therefore the cost of the device can be reduced. More specifically, even when cables of the same length are used or when both ends of a plurality of cables are assembled in one piece, the requirement of the present invention that the individual direction reversal sections are spaced at intervals in the circumferential direction can be fulfilled. Further, a plurality of transmission cables can be connected to external equipment with a connector by gathering odd or respective sides of the transmission cables or by providing the inner and outer cases formed with wires. In addition, the transmission cables can be easily configured using bare transmission lines.

DETAILED DESCRIPTION

Figure 1:
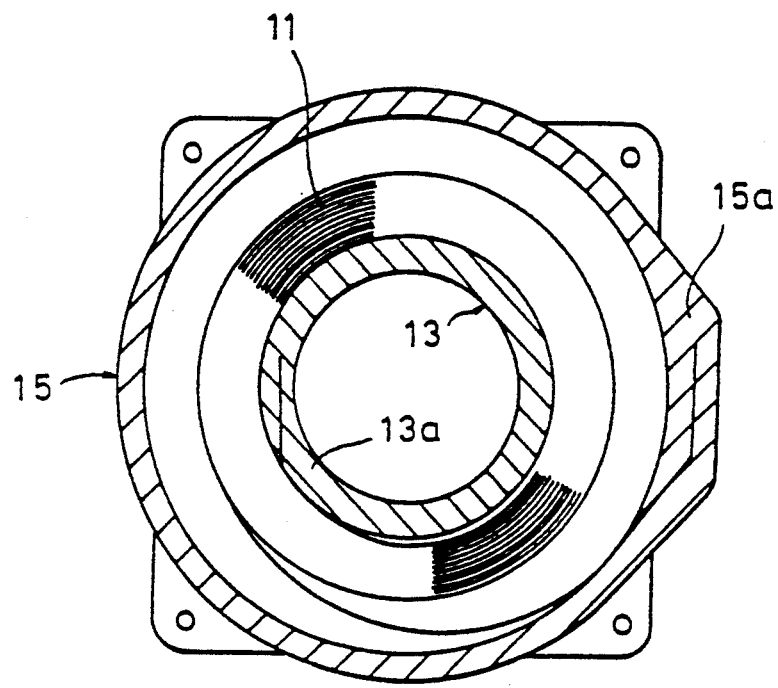
FIG. 1 is a transverse sectional view of a conventional transmission device.
Figure 2:
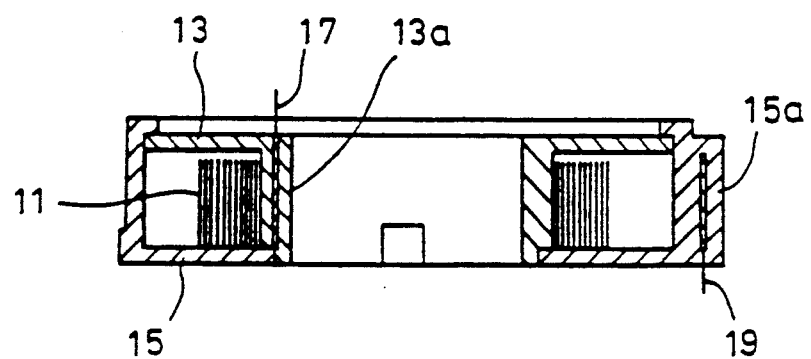
FIG. 2 is a longitudinal sectional view of the conventional device shown in FIG. 1.
Figure 3:
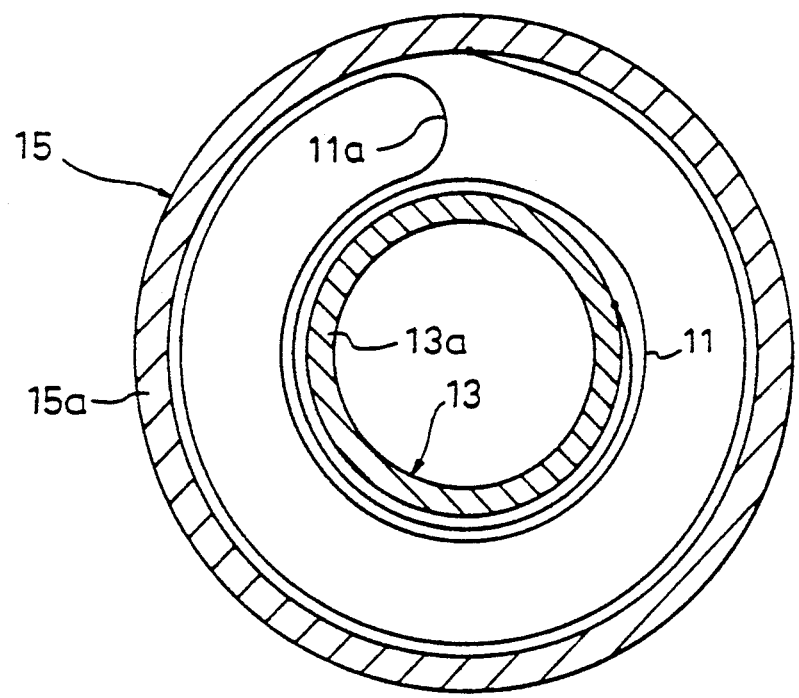
FIG. 3 is a transverse section of the conventional device wherein an FFC is U-turned at the middle point.

Referring to FIG. 1 through FIG. 3, the aforementioned two types of the conventional devices will be explained again. The conventional device shown in FIG. 1 and FIG. 2 is equipped with a spirally wound flexible flat cable (FFC) 11, and an inner case 13 and an outer case 15 for housing or accepting the cable. The inner end of the FFC 11 is fixed to an inner cylindrical section 13a of the inner case 13 and also connected to a lead wire 17 which is attached to the inner cylindrical section 13a. The outer end of the FFC 11 is fixed to an outer cylindrical section 15a of the outer case 15 and also connected to a lead wire 10 attached to the outer cylindrical section 15a. The inner case 13 and the outer case 15 are mounted, for example, on an automotive steering shaft (not shown), which is a rotary component, and a steering column (not shown), which is a stationary component, respectively, so that they are rotatable relatively to each other, thereby permitting signal transmission between the rotary component and the stationary component within a range where the spirally wound FFC 11 can be wound or unwound. This transmission device, however, has a drawback in that as the number of windings of the FFC is increased to rise the possible number of relative revolutions of the inner case and the outer case, the possibility of occurrence of trouble such as FFC's reversing and bending increases.

In the transmission device shown in FIG. 3 which has been proposed to eliminate the above-mentioned disadvantage, the FFC 11, both ends thereof are fixed to the inner and outer cases 13 and 15, respectively, is U-turned at the middle so that the winding direction of the FFC on the inner half side is opposite from that on the outer half side. According to this proposed device, when the inner case 13 is rotated counterclockwise, for example, relative to the fixed outer case 15, a U-turn section 11a of the FFC 11 moves counterclockwise to half offset the relative rotation that takes place between the two cases 13 and 15 and to enhance transmission of the rotary force of the inner case to the whole FFC 11 (especially the U-turn section 11a). In other words, it is possible to increase the possible number of relative revolutions of the inner and outer cases even when the FFC 11 has fewer windings and a smaller length. When the inner case 13 is rotated clockwise, however, the FFC 11 unwound from the inner case 13 tends to slack, often causing the U-turn section 11a to fail to turn clockwise. As a result a problem is raised where the inner case 13 fails to turn properly.

Figure 4:
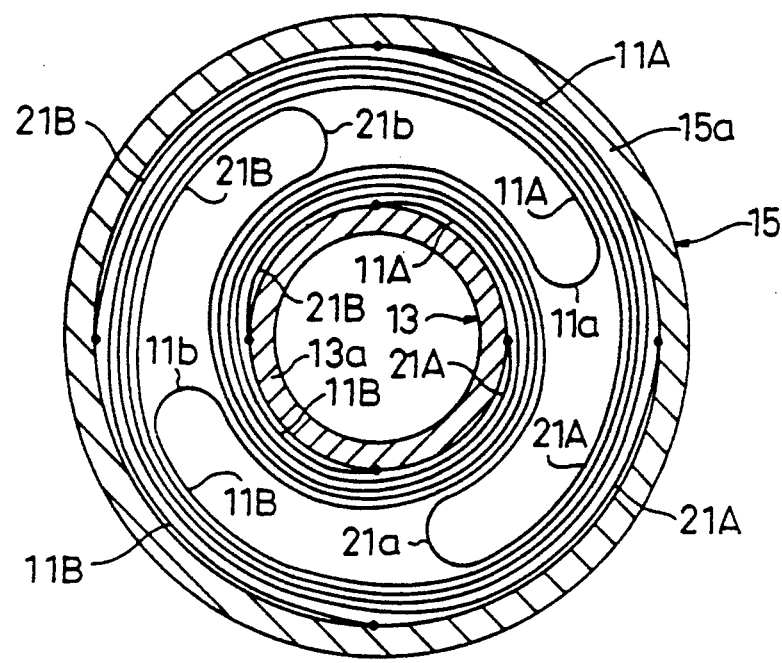
FIG. 4 is a transverse sectional view of a transmission device according to a first embodiment of the present invention.

The following describes the transmission device according to the first embodiment of the present invention, referring to FIG. 4.

The transmission device of this embodiment basically shares the same configuration as that of the conventional device shown in FIG. 1 through FIG. 3. To be more specific, the inner end of the flexible flat cable (FFC) 11 is fixed to the drum section 13a of the inner case 13, while the outer end of the FFC 11 is fixed to the outer cylindrical section 15a of the outer case 15. Further, the inner end section of the FFC 11 is wound onto the inner case cylindrical section 13a in one direction, while the outer end section of the FFC 11 is wound circumferentially along the inner surface of the outer cylindrical section 15a of the outer case, so that it is wound in the opposite direction from that of the inner end section of the FFC. This forms a winding direction reversal section 11a. where the cable winding direction. i.e.. the cable turning direction, is reversed, in the middle part of the FFC 11. The FFC 11 in this embodiment comprises a plurality of conductors which are arranged in parallel to each other and covered with an insulating material.

Unlike the conventional device shown in FIG. 3 which includes only a single FFC, the transmission device according this embodiment has a plurality of cables. More specifically, the transmission device has the FFC 11 as a transmission cable, and three dummy cables 21A, 21B and 21C wrapped over the FFC 11. For the dummy cables 21A through 21C, polyester tape, polyimide tape or the like, which has elasticity that is at least equal to that of the FFC 11 and which is about the same size as the FFC11, may be used. Like the FFC 11, the dummy cables 21A through 21C have their inner ends fixed to the cylindrical section 13a of the inner case and their outer ends fixed to the outer cylindrical section 15a of the outer case, and they are wound in the same direction as the FFC 11, winding direction reversal sections 21a, 21b and 21c being provided at the middle. The winding direction reversal section 11a of the FFC 11 and winding direction reversal sections 21a through 21c of the dummy cables 21A through 21C are spaced preferably at equal intervals circumferentially along the inner case drum section 13a and the outer case cylindrical section 15a.

While the transmission device of this embodiment basically operates in the same way as the conventional device shown in FIG. 1 through FIG. 3, it is different from the conventional device in that the flat cable 11 in no way develops a slack even when the inner case 13 or the outer case 15 perform reciprocating revolution.

Specifically, the winding direction reversal sections 11a and 21a through 21c of the flat cable 11 and the dummy cables 21A through 21C are distributed to four points circumferentially along the inner and outer cases 13 and 15, so that the direction reversal sections 11a, 21a, 21b or 21c is stressed into elastic deformation, and hence generates an elastic reaction force which works to press the cable inner end section against the inner case drum section 13a, and an elastic reaction force causing the cable outer end section to be pressed against the outer case cylindrical section 15a. As a result, the flat cable 11 is pressed against the drum section 13a and the outer cylindrical section 15a by the elastic reaction force of the winding direction reversal sections 11a and 21a through 21c at the four points in the circumferential direction of the cases, thus preventing the flat cable 11 from slicking.

As discussed above, according to the transmission device of the present embodiment, it is possible to eliminate the occurrence of operational trouble of the transmission device caused by a slack of the flat cable 11. In other words, the transmission device features high operation reliability, and enables the possible number of revolutions of the inner case 13, i.e., the rotary component, relative to the outer case 15, i.e., the stationary component, to be increased while keeping the flat cable 11 short.

The device of FIG. 4 concerning the aforementioned embodiment may be modified in various ways. For instance, the number of the flat cables or dummy cables is selectable, and it is not essential to provide the dummy cables.

Figure 5:
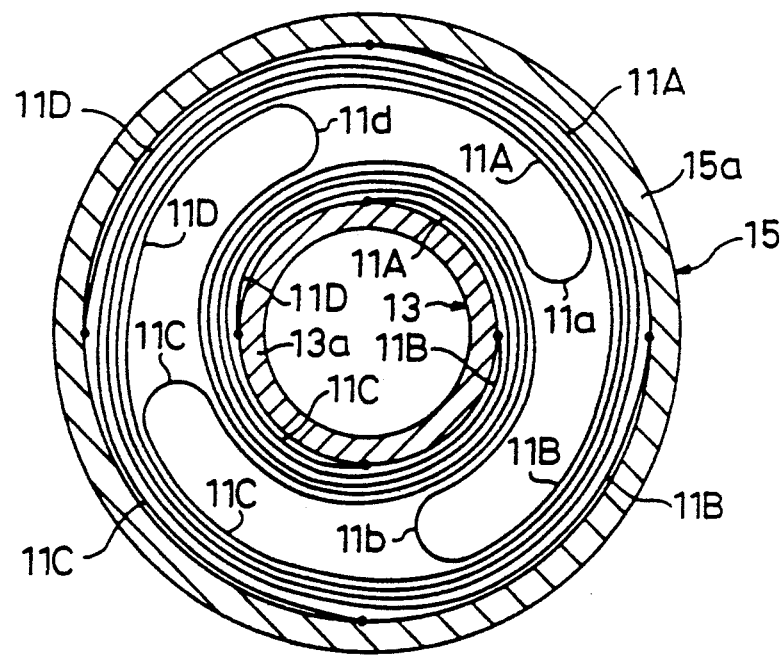
FIG. 5 is a transverse sectional view which shows a variation of the device of FIG. 4.

FIG. 5 shows a transmission device wherein two flat cables 11A and 11B and two dummy cables 21A and 21B are alternately wound and overlapped. The reference numerals 11a and 11b represent the winding direction reversal sections of the flat cables 11A and 11B, respectively, while 21a and 21b represent the winding direction reversal sections of the dummy cables 21A and 21B, respectively.

Figure 6:
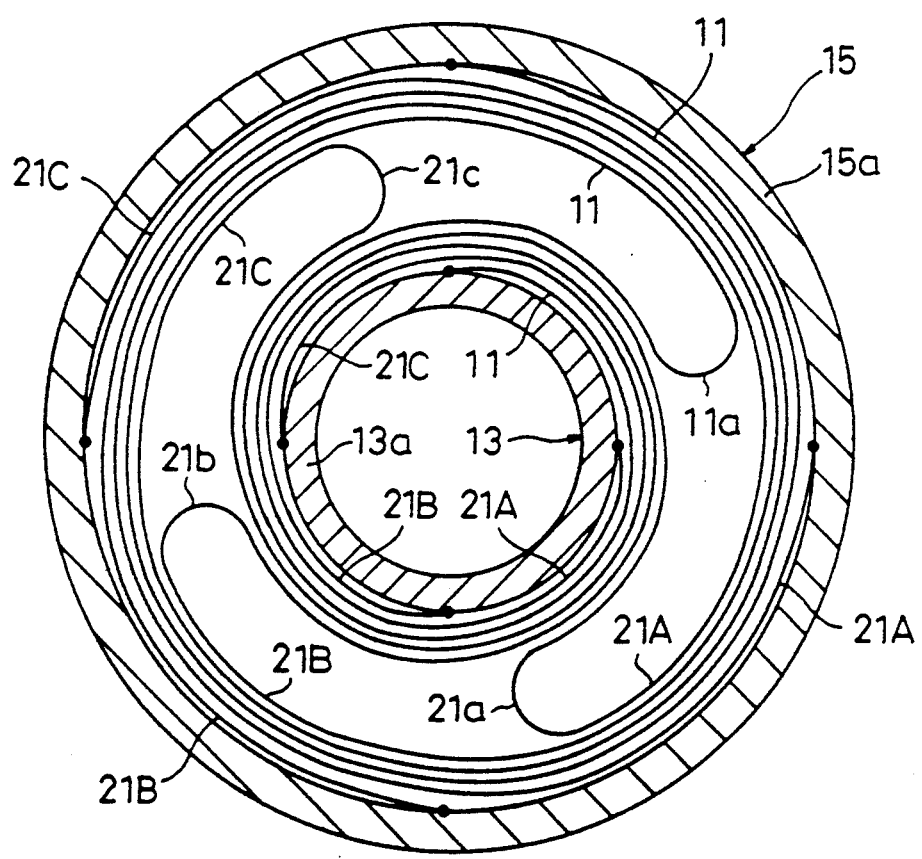
FIG. 6 is a transverse sectional view which shows another variation of the device of FIG. 4.

FIG. 6 shows another variation of the transmission device of FIG. 4. This transmission device does not use any dummy cables, but it has four flat cables 11A through 11D that are wound and overlapped. Reference numerals 11a through 11d respectively represent the winding direction reversal sections of the flat cables 11A through 11D.

Next, the transmission device of a second embodiment of the present invention will be explained in detail, referring to FIG. 7.

The transmission device of this embodiment is different from the device of the first embodiment described above primarily in that it is more compact, and it is characterized mainly in that it comprises a plurality of transmission cables, each of the cables comprising a single covered transmission line, and it uses an inner case which does not have a drum section.

Detailedly, a rotary connector 201 that serves as the transmission device is mounted on an automotive steering system, for example, and it is provided with a first housing (corresponding to the outer case 15 shown in FIG. 4) which comprises a disc base plate 202 and an outer case 204, and a second housing (corresponding to the inner case 13 shown in FIG. 4) which comprises a disc roll plate 203, each of the elements 202 through 204 being made of synthetic resin molded into one piece. The outer case 204 comprises an outer cylindrical section 204a, which is a hollow cylindrical component, and an upper flange 204b which extends inward in the radial direction of the case from the top edge of the outer cylindrical section. The roll plate 203 has an outside diameter which is slightly smaller than the inside diameter of the outer case, and it is supported by the base plate 202 and the outer case 204 so that it is rotatable between them, and is fixed to a steering shaft (not shown) so that it is rotatable relative to the first housing 202, 204 fixed to a steering column (not shown).

More specifically, the base plate 202 has a large through hole 202a at its center. The roll plate 203 has a through hole 202a in alignment with the through hole 202a, and a rectangular key way 203c opened to the through hole 203a. A steering shaft is designed so that it passes through the through holes 202a and 203a and a flat cable air-core section, described later, and rotates together with the roll plate 203, with a key, which si formed circumferentially along the outer surface of the steering shaft, fits into the key way 203c.

On the outer circumferential edge of the base plate 202, three mounting flanges 202b are formed integrally with the base plate at approximately equal angle intervals. On the outer cylindrical section 204a of the outer case, three mounting flanges 204c are formed integrally with the outer cylindrical section, being aligned with the mounting flanges 202b. The base plate 202 and the outer case 204 are fixed to the steering column with bolts (not shown), which are inserted into holes 202d and 204d provided in the mounting flanges 202b and 204c, and nuts (not shown).

In the flat cylindrical space formed by the base plate 202 and the roll plate 203, a plurality of, six, for example, flat cables 205 are received in a state where it is wound spirally with an air core. Each flat cable 205 is comprised of a single electric conductor covered with an insulating material, and it is flexible. Additionally, each flat cable 205 is wound back in the opposite direction at its middle point. In the figure, reference symbol T denotes the winding-back section, i.e., the winding direction reversal section. The direction reversal sections T of the six flat cables 205 are provided at equal intervals in the circumferential direction of the case.

Six outside connecting terminals 205a, mounted on the outer ends of the six flat cables 205, coordinate with a connector socket housing 202c, formed integrally with the outer circumferential edge of the base plate 202, to constitute a connector socket which serves as the outer connector half. A connector plug (not shown), to which an electrical part (not shown) on the stationary component side is connected, is plugged in this connector socket. Further, a connector socket, serving as the inner connector half in which a connector plug (not shown) with an electric part (not shown) connected on the rotary component side si plugged, comprises six inside connecting terminals 203b embedded in the roll plate 203, and a connector socket housing 206 which is mounted on the roll plate 3 in a state that the terminals 203b is received in the housing. The inner end of each flat cable 205 is connected to a corresponding one of the connecting terminal 203b.

The assembly of the rotary connector 201 having the aforementioned construction is now explained.

To assemble the rotary connector 201, first, for example, the inner end sections of the six flat cables 205 are wound spirally with an air core in it, and the middle parts of the cables are wound back in the opposite direction from the winding direction of the cable inner end sections, so that the winding direction reversal sections T are appropriately positioned at equal intervals circumferentially around the case. Further, the outer end sections of the cables are wound spirally. Then, the inner ends of the flat cables 205 are attached to the connecting terminals 203b of the roll plate 203 by solder, for example, and the housing 206 is mounted on the roll plate 203, with the connector socket housing 206 holding the connector terminals 203b in it. Furthermore, the connecting terminals 205a installed on the outer ends of the flat cables 205 are placed in the connector socket housing 202c of the base plate 202. This causes the flat cables 205 to be placed between the base plate 202 and the roll plate 203b.

Next, the outer case 204 is mounted on the base plate 202 so that the roll plate 203 and the flat cables 205 are accepted in the hollow section of the outer case 204, and the mounting position of the outer case 204 on the base plate 202 is adjusted to align a hole 204d provided in a mounting flange 204c of the outer case 204 with a hole 202d provided in the mounting flange of the base plate 202. Then, nuts are screwed onto the bolts that are inserted in the holes 202d and 204d. This completes the preliminary assembly of the rotary connector 201.

To install the rotary connector 201 to a steering system of a vehicle, the steering shaft is inserted in the through holes 202a and 203a which are respectively formed in the base plate 202 and the roll plate 203, and the air-core section of the flat cables 205, with the key of the vehicle steering shaft fitted in the key way 203c which is formed in the roll plate 203 of the preliminarily assembled rotary connector 201. Next, the nuts are removed from the bolts. Thereafter, the mounting holes 202d and 204d respectively formed in the base plate and the outer case are aligned with the mounting holes (not shown) in the steering column, and the rotary connector 201 is fixed to the steering column using the bolts which are inserted in the mounting holes and the nuts matching the bolts. This completes the assembly of the rotary connector.

Figure 8:
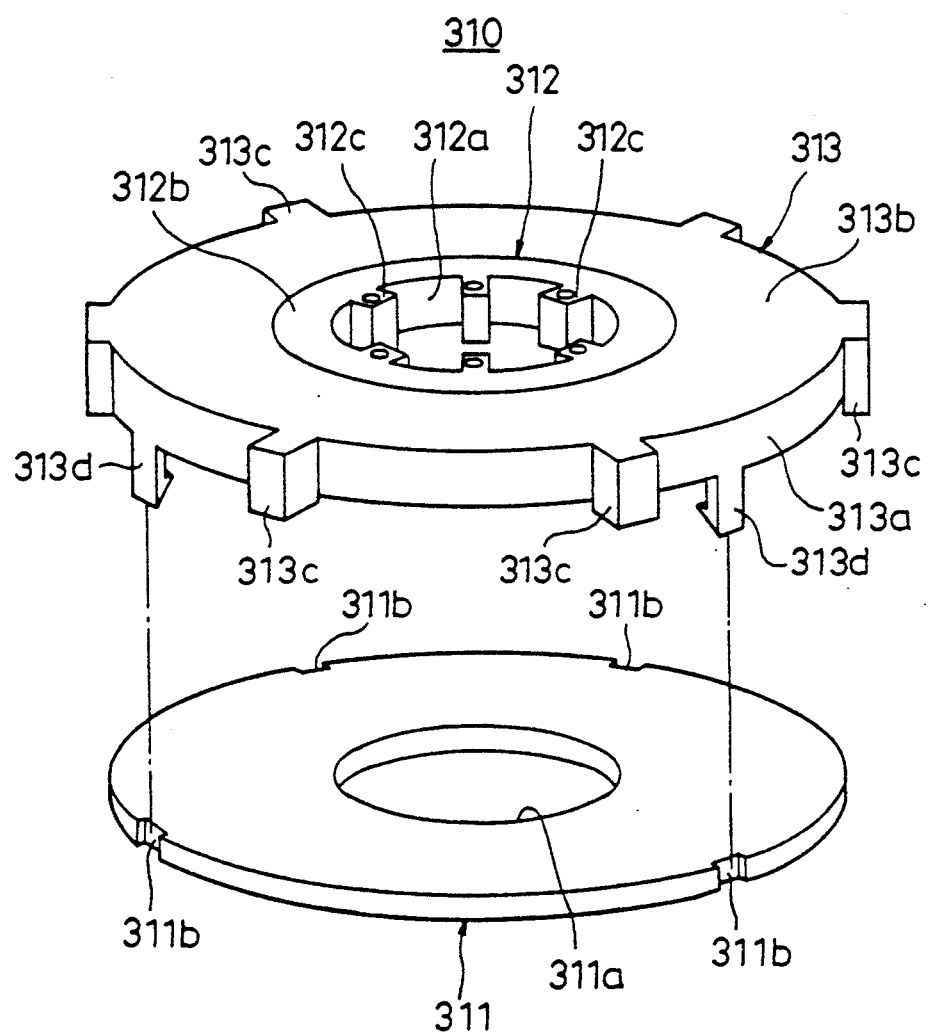
FIG. 8 is an exploded perspective view which shows a rotary connector related to a third embodiment of the present invention, a flat cable being excluded.

The rotary connector 201 which is configured and assembled as described above operates almost the same as the device of the first embodiment shown in FIG. 4 and the variations shown in FIG. 5 and FIG. 8. Accordingly, detailed explanation about the operation of the rotary connector 201 will be omitted.

To be brief, when the steering shaft rotates relative to the steering column, the roll plate 203 rotates relative to the base plate 2 and the outer case 4 while moving the winding-back sections T of the flat cables 205 in the circumferential direction of the case. During the rotation of the roll plate 203, the inner and outer end sections of the six flat cables 205 are pressed inward and outward, respectively, in the radial direction of the case by the elastic reaction force of the cable winding direction reversal sections T which are provided at approximately equal intervals in the circumferential direction of the case. As a result, the cable winding direction reversal sections T are allowed to move only in the circumferential direction of the case, which means that the cables 205 do not develop slack. Therefore, the roll plate 203 performs smooth and stable revolution relative to the base plate 202 and the outer case 204, without using any auxiliary tools.

Additionally, in comparison with the rotary connector which uses a flat cable consisting of six electric conductors covered with an insulator, the rotary connector 201 which uses six flat cables 205, each comprising a single sheathed transmission line, makes it possible to reduce the width of the flat cables 205 with resultant reduction of the height of the rotary connector 201 to approximately one sixth despite the fact that it provides the same number of electrical circuits.

Figure 9:
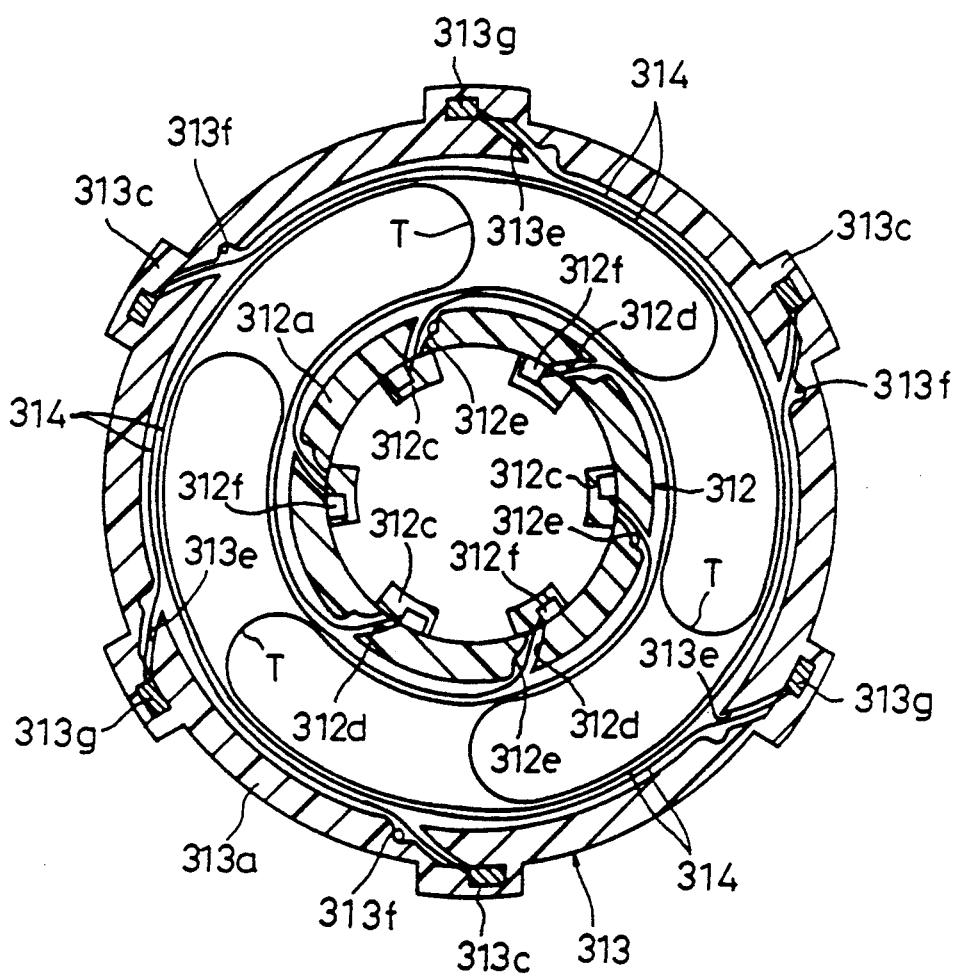
FIG. 9 is a transverse sectional view of the rotary connector of FIG. 8.

The following describes the rotary connector according to a third embodiment of the present invention, referring to FIG. 8 and FIG. 9.

Figure 7:
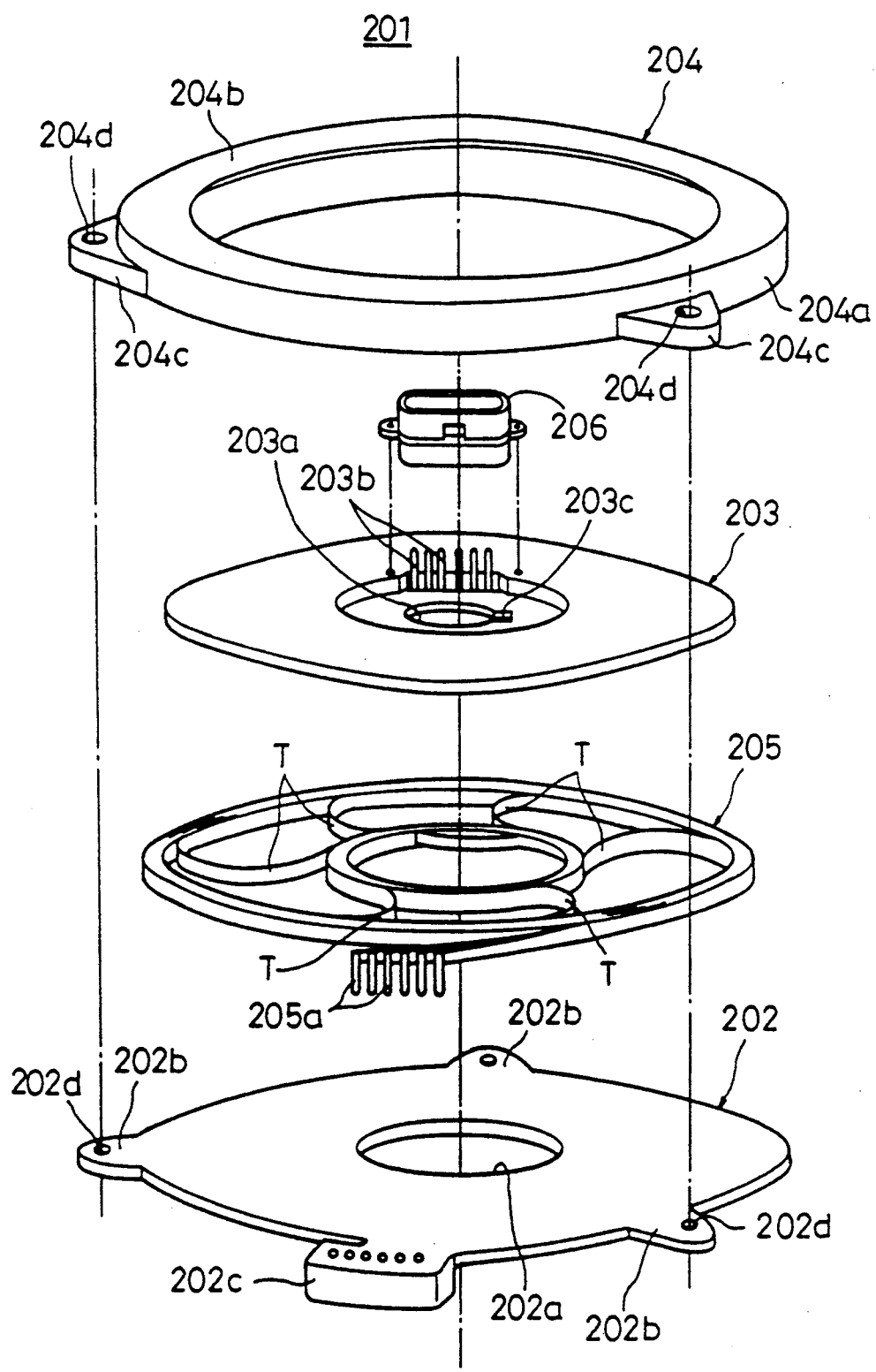
FIG. 7 is an exploded perspective view which shows a rotary connector related to a second embodiment of the present invention.

The rotary connector of this embodiment basically shares the same configuration as that of the aforementioned second embodiment shown in FIG. 7. On the other hand the device of this embodiment is different from the device of the second embodiment which uses a single connector to connect one side of the plurality of flat cables with an electric component, in that it uses a plurality of connectors for the connection between an electric component and the cables, and uses a different method for fixing the base plate and the outer case.

As shown in FIG. 8 and FIG. 9, a rotary connector 310 is equipped with a base plate 311, an inner case 312, an outer case 313, and six flat cables 314. All the elements 311 through 313 are provided as one-piece moldings made of synthetic resin. The base plate 311 cooperates with the outer case 313 to constitute a first housing which is the fixed side, while the inner case 312 constitutes a second housing which is the rotary side. FIG. 8 shows the inner case 312 installed to the outer case 313. When the rotary connector 310 is assembled so that the inner case 312 is held between the base plate 311 and the outer case 313, a circular oblong space is formed inside the elements 311 through 313. This space houses the six flat cables 314 which are spirally wound and overlapped.

The base plate 311 is a disc component with an opening 311a formed at its center, and four engaging recesses 311b are provided on the outer circumferential edge at about equal angular intervals.

The inner case 312 consists of an inner cylindrical section (drum section) 312a and an upper flange 312b which extends radially outwardly from the top edge of the outer circumferential surface of the inner cylindrical section. Six connectors 312c are provided on the inner circumferential surface of the inner cylindrical section 312a at equal angular intervals. As shown in FIG. 9, at the places where the connectors are provided, the inner cylindrical section 312a of the inner case 312 is formed with inner slits 312d into which the inner ends of the flat cables 314 are inserted. Each slit 312d is oriented aslant inside the inner cylindrical section 312a, as viewed in horizontal cross-section. Further, at the places where the slits are formed, the outer circumferential surface of the inner cylindrical section 312a is formed with grooves 312e having a V-shaped horizontal section, the grooves being formed in the axial direction of the case.

The outer case 313 comprises an outer cylindrical section 313a and an upper flange 313b which extends radially and inwardly from the top edge of the inner circumferential surface of the outer cylindrical section. The inside diameter of the upper flange 313b is set to be slightly larger than the outside diameter of the upper flange 312b of the inner case 312, so as to permit the relative revolution between the upper flange 313b and the inner case 312. On the outer circumferential surface of the outer cylindrical section 313a are formed six connectors 313c at equal angle intervals, and at the bottom of the outer cylindrical section 313a are provided four locking books 313d which engage with the four engaging recessions 311b provided on the base plate 311. Further, as shown in FIG. 9, outer slits 313e, into which the outer ends of the flat cables 314 are inserted, are provided at the places where the connectors of the outer cylindrical section 313a of the outer case 313 are formed. At the places where the slits are formed, the inner circumferential surface of the outer cylindrical section 313a is formed with grooves 313f having a V-shaped section the grooves being formed in the axial direction of the case. Additionally, as shown in FIG. 9, the connectors 312c and 313c have connecting terminals 312f and 313g which connect the flat cables 314 with the lead wires extending from external equipment.

A flat cable 314 is a single transmission line comprising a single electric conductor covered with an insulator. The six flat cables 314 are spirally wound and overlapped, as shown in FIG. 9, each flat cable 314 being wound back at its midway point. The winding-back sections T are arranged at approximately equal intervals in the circumferential direction. The inner and outer ends of the flat cables 314 are connected to the connectors 312c provided on the inner case 312 and the connectors 313c provided on the outer case 313, respectively, by using the slits 312d and 313e, as shown in FIG. 9.

In assembling the rotary connector 310 of the embodiment, the six flat cables 314 are spirally wound and overlapped, the cables are wound back in the opposite direction at their middle points in such a manner that the winding-back sections T are arranged at approximately equal intervals in the circumferential direction, and the inner and outer ends of the cables are connected to the connectors 312c and 313c, respectively. The inner case 312 is placed between the base plate 311 and the outer case 313. Then, the locking hooks 313d are engaged with corresponding engaging recessions 311b, with the six flat cables 314 received in the resultant flat circular space.

The operation of the rotary connector 310, which is configured as described above, will now be explained briefly.

When the inner case 312 rotates relative to the base plate 311 and the outer case 313 as the rotary component turns, the winding-back sections T of the six flat cables 314, which are arranged at approximately equal angle intervals, press the inner and outer end sections of the flat cables 314 inward and outward in the radial direction of the case. As a result, the winding-back sections T smoothly move circumferentially thus permitting smooth and stable rotation of the inner case 312 relative to the base plate 311 and the outer case 313, without causing the cable 314 to slack.

In this case, when the inner case 312 turns clockwise relative to the base plate 311 and the outer case 313 in FIG. 9, the flat cables 314 are unwound as the winding-back sections T move clockwise circumferentially. On the other hand when the inner case 312 rotates counterclockwise, the flat cables 314 are wound as the winding-back sections T move counterclockwise circumferentially. Further, when the inner case 312 has rotated a predetermined number of revolutions which is determined by the length of the flat cables 314, an ultimate inner case revolution position where the flat cables 314 are almost fully wound by the inner cylindrical section 312a of the inner case is reached, or a neutral revolution position where the cables are fully unwound from the inner cylindrical section is reached, causing the winding-back sections T at the middle of the cables to disappear.

Figure 10:
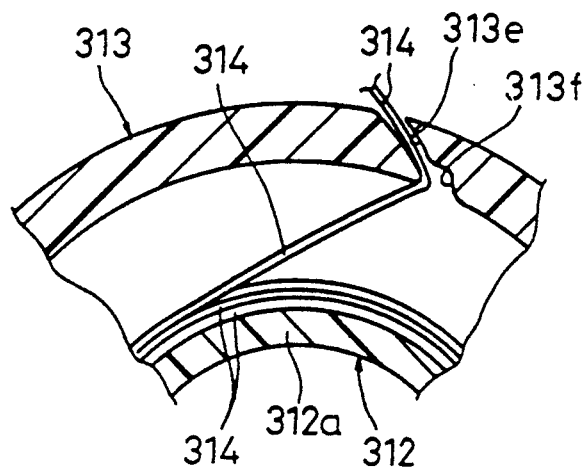
FIG. 10 is a fragmentary transverse sectional view of the flat cable of the rotary connector of FIG. 8, the cable being bent on the outer case side.

More specifically, when, for example, the inner case 312 turns counterclockwise from a state where the winding-back sections T exist at the middle of the cables as shown in FIG. 9 and reaches the ultimate revolution position of the inner case which is related to the counterclockwise rotation, the flat cables 314 are almost fully taken up by the inner cylindrical section 312a, as shown in FIG. 10. In this case, the flat cables 314 bend at the end on the inner case side of the slits 313e of the outer case 313, developing a tendency of bending at their outer ends of the cables. When the inner case 312 reaches the ultimate revolution position shown in FIG. 10, the inner case 312 is no longer allowed to turn counterclockwise, and the inner case is enabled to turn only clockwise.

Figure 11:
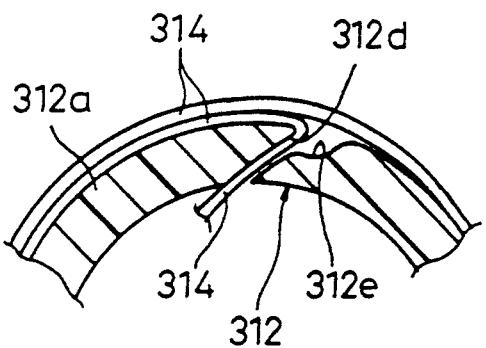
FIG. 11 is a fragmentary transverse sectional view of the flat cable of the rotary connector of FIG. 8, the cable being bent on the inner case side.

On the other hand, when the inner case 312 turns clockwise from the state shown in FIG. 9 and reaches the inner case neutral revolution position, the flat cables 314 are nearly fully unwound from the inner cylindrical section 312a. After that, as the inner case 312 further turns clockwise, as shown in FIG. 11, the inner end sections of the flat cables 314 are taken up by the inner cylindrical section 312a of the inner case in the opposite direction from that shown in FIG. 9. In this case, the flat cables 314 bend at the end on the outer case side of the slits 312d of the inner case 312, developing a habit of bending at their inner ends of the cables.

Once the flat cables 314 develop the habit of bending at their inner or outer ends, inconveniences such as a slack generated in the cables 314 during the operation of the rotary connector 310 result. To avoid such inconveniences caused by the bend of the cables, the inner cylindrical section 312a and the outer cylindrical section 313a of the rotary connector 310 of this embodiment are provided with recessed grooves 312e and 313f. The following explains the function of the recessed grooves.

Figure 12:
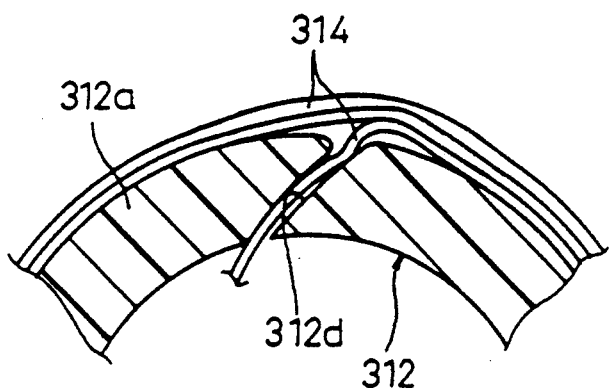
FIG. 12 is a fragmentary transverse sectional view which shows the behavior of the flat cable when the slits of the inner case have no recessed grooves.

If the flat cables 314 develop the bending habit, the inner case 312 turns clockwise after it reaches the inner case ultimate revolution position shown in FIG. 10, or it turns counterclockwise after reaching the inner case neutral revolution position, causing the problems set forth below when it goes back to the normal state where the winding-back sections T are formed at the middle of the cables. If the inner cylindrical section 312a (FIG. 12). for instance, does not have the recessed grooves 312e (FIG. 12). for instance, the cables 314 which are wound and overlapped on the bent part on the inner end side of the flat cables 314 are pushed up by the cable bent part causing the cables 314 which are wound and overlapped on the cable bent part or the cables 314 which are further wound and overlapped onto the former to easily loosen. The loosened cables prevent the winding-back sections T from moving in the circumferential direction when the inner case 312 rotates. The same phenomenon takes place when the flat cables develop a bending habit at their outer end.

If, however, V-shaped grooves 312e and 313f are formed at the slits in the inner case 312 and the outer case 313, then the cable bent part is kept in the recessed grooves 312e and 313f, and therefore, the flat cables 314 which are wound and overlapped on the cable bent part are not pushed up by the cable bent part. As a result, the movement of the winding-back sections T in the circumferential direction is not prevented when the inner case 312 rotates, thus ensuring smooth and stable rotation of the inner case 312 relative to the base plate 311 and the outer case 313.

The rotary connector according to a fourth embodiment of the present invention will now be described.

This embodiment intends to provide a rotary connector which is useful for applications where fewer electric circuits are required for transmission between a rotary component and a stationary component.

Figure 13:
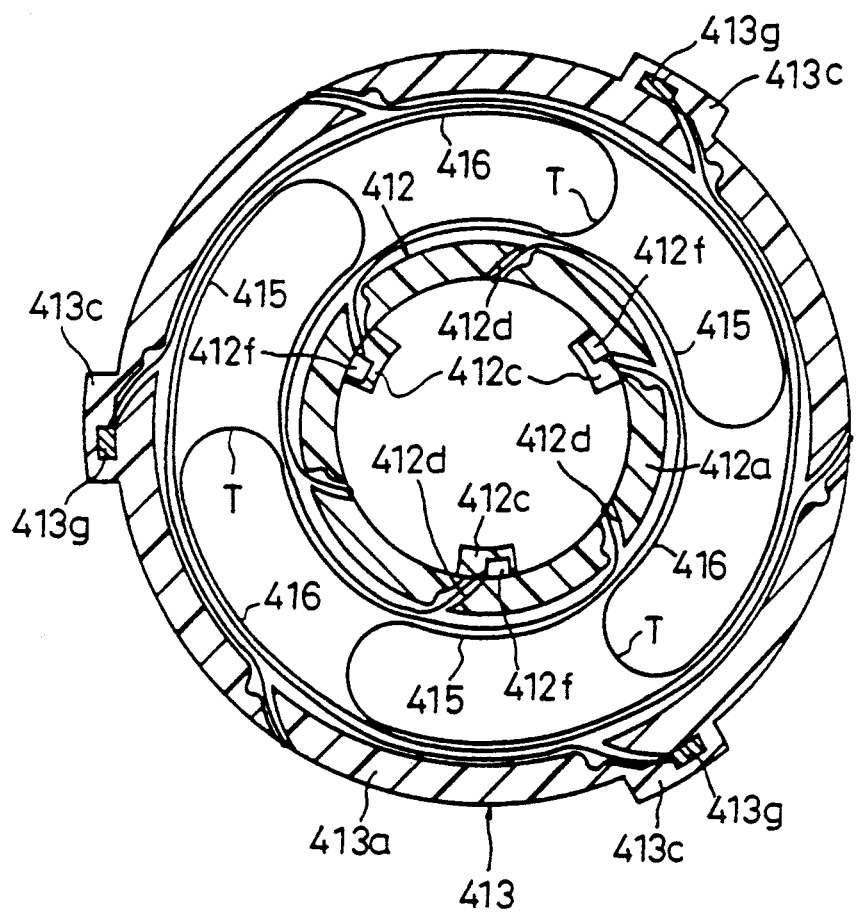
FIG. 13 is a transverse sectional view which shows a rotary connector according to a fourth embodiment of the present invention.

Referring to FIG. 13, the rotary connector 410 is equipped with three transmission cables 415 each comprising an electric conductor with no insulation coating and three insulating cables 416 each comprising insulating tape. The transmission cables 415 and the insulating cables 416 are wound and overlapped alternately and spirally, each cable being wound back at its middle point. The winding-back sections T of the cables 415 and 410 are arranged in the circumferential direction at approximately equal intervals. The three insulating tapes 16 are used to arrange the winding-back sections T of the cables 415 and 416 at approximately equal angular intervals primarily to ensure smooth circumferential movement of the winding-back sections T. Therefore, it is not essential to constitute the transmission cables with bare electric conductors: instead, each transmission cable 415 may be comprised of a transmission line comprising a single electric conductor provided with insulation coating.

The following explains the rotary connector according to a fifth embodiment of the present invention.

The rotary connector of this embodiment is basically configured in the same manner as that of the aforesaid third embodiment shown in FIG. 8 and FIG. 9, and it has a plurality of inner connecting terminals and a plurality of outer connecting terminals provided on the inner case and the outer case at intervals in the circumferential direction. On the other hand unlike the rotary connector of the third embodiment which is designed to directly connect external equipment to the connecting terminals. The rotary connector of this embodiment has wires which are provided between the connecting terminals and the external equipment to reduce the number of connecting points between the rotary connector and the external equipment.

Figure 14:
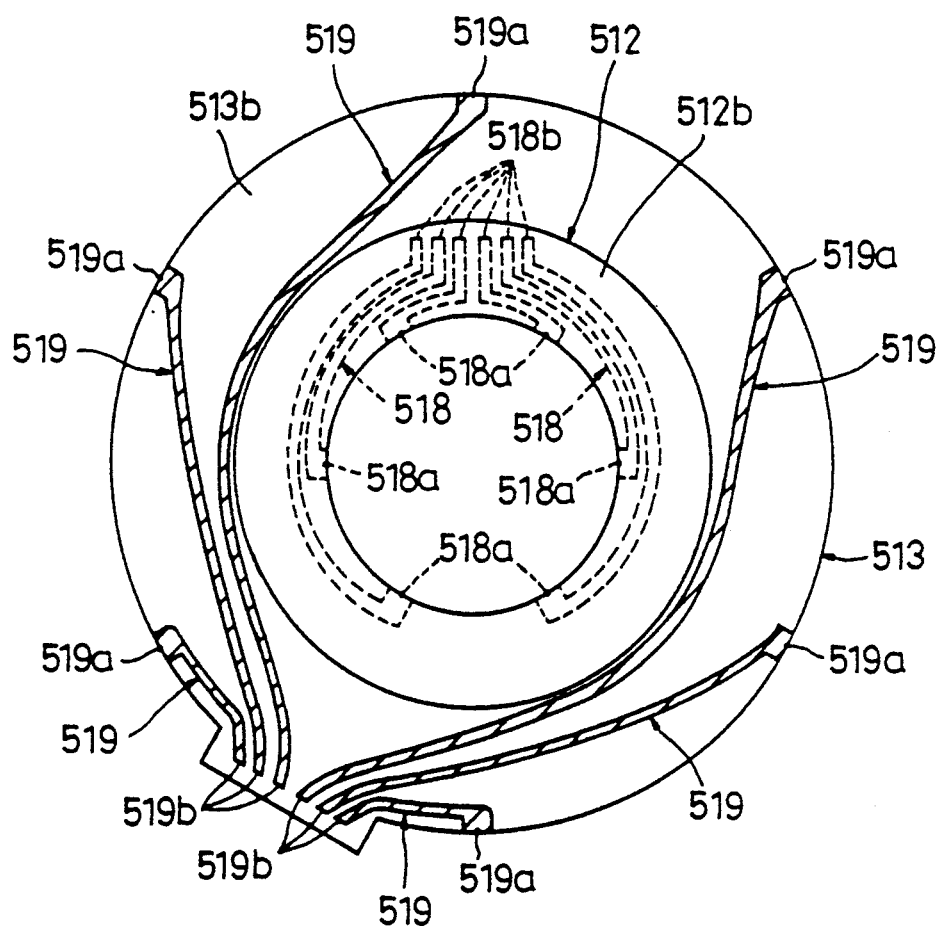
FIG. 14 is a transverse sectional view which shows a rotary connector according to a fifth embodiment of the present invention.

Referring to FIG. 14, in a rotary connector 510, on an upper flange 512b of the inner case 512 are provided six wires 518 comprising printed wires or bus bars. The ends 518a of one side of the six wires 518 are arranged on the inner circumferential edge of the upper flange 512b at equal angular intervals, while the ends 518b of the other side are gathered and placed on one side of the outer circumferential edge of the upper flange 512b. As viewed from the top, a left half of the upper flange 512b is provided with three arc wires 518, all having different lengths, which are formed concentrically with one another. A right half of the upper flange is also provided with three wires 518 in the same manner as the wires 518 formed on the left half of the upper flange, so that they are line-symmetrical to the wires of the left half.

On an upper flange 513b of the outer case 513 are provided six wires 519 comprising printed wires or the like. The ends 519a on one side of the wires 519 are arranged on the outer circumferential edge of the upper flange 519b at equal angle intervals, while the ends 519b of the other side are gathered and placed on one side of the outer circumferential edge.

The inner ends and the outer ends of the flat cables (not shown) are connected to ends 518a of wires 518 and ends 519a of wires 519, respectively. In addition, lead wires extending from the external equipment on the rotary component side are respectively connected to the other ends 518b of the six wires 518 which are gathered on the outer circumference side of the inner case 512. Likewise, lead wires extending from the external equipment on the stationary component side are connected to the other ends 519b of the six lead wires 519 which are gathered on the outer circumference side of the outer case 513. As a result, the number of points used for connecting to the external equipment is reduced to two, permitting further reduction in the size of the rotary connector.

The transmission device according to a sixth embodiment of the present invention will now be described.

Figure 15:
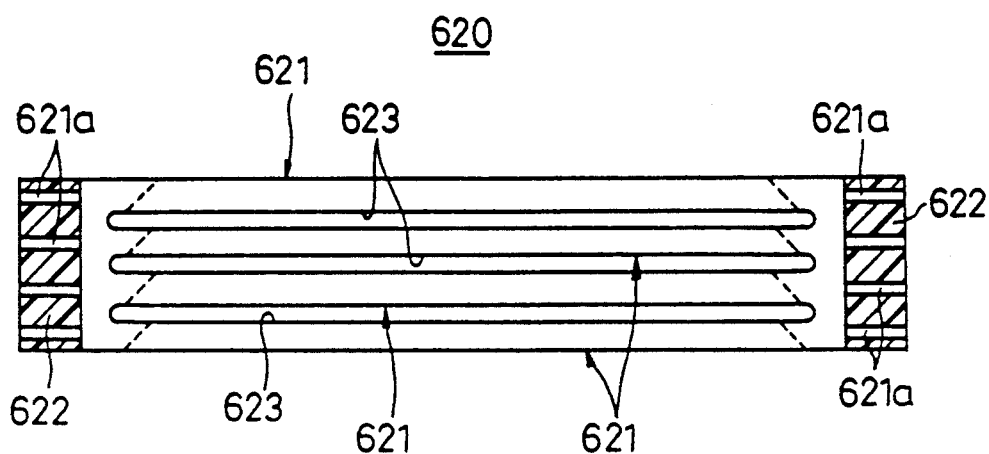
FIG. 15 is a front view of a flat cable used with a rotary connector of a sixth embodiment of the present invention.
Figure 16:
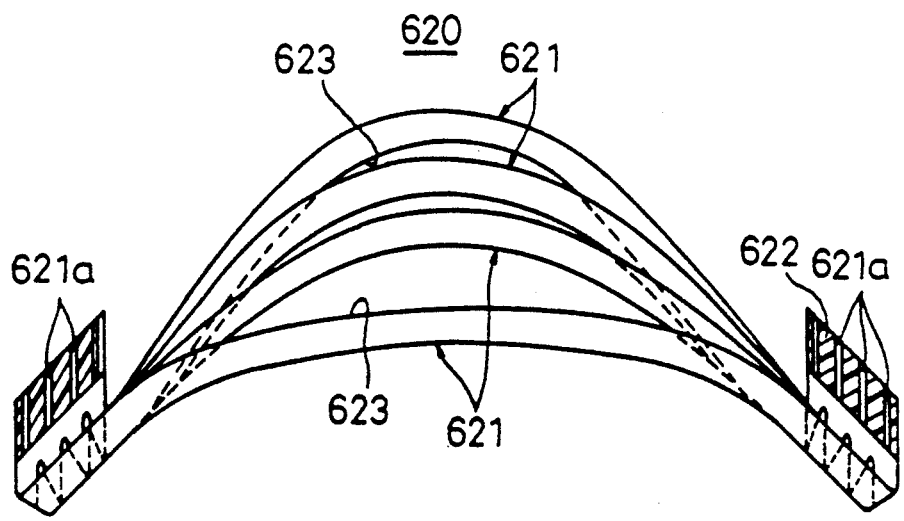
FIG. 16 is a perspective view which shows the flat cable of FIG. 15 in a bent state.

The device of this embodiment basically shares the same configuration as that of the second embodiment shown in FIG. 7 but it is different from the second embodiment in that the device uses a flat cable 620 shown in FIG. 15 in order to simplify the configuration of the cable.

To be specific as shown in FIG. 15, a flat cable 620 is composed of a collection of a plurality of single cables 621, each comprising an electric conductor 621a covered with an insulator 622, slits 623 being formed between adjacent cables 621. In other words, the flat cable 620 is comprised of a plurality of transmission cables each comprising a single sheathed transmission line, and these transmission cables are gathered into a bundle on both ends while they are separated in the remainder.

Figure 17:
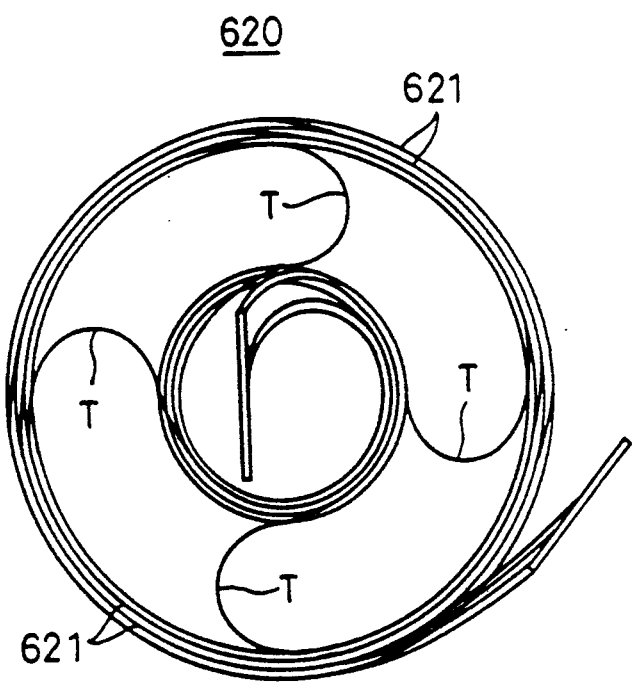
FIG. 17 is a plan view which shows a state where the flat cable of FIG. 15 is arranged in the rotary connector.

To install the flat cable 620 to the rotary connector, electric conductors 621a on both ends of each of the cables 621, which constitute the flat cable 620, are exposed, and the cables 621 are bent along zigzag lines shown by the dotted lines in FIG. 15 so that the cables 621 are seemingly separated from one another (FIG. 10). Further, as shown in FIG. 17, the cables 621 are spirally wound and overlapped, each of the cables 621 is wound back in the opposite direction, and winding-back sections T are provided in the circumferential direction at approximately equal intervals.

Configuring the flat cable 620 as described above makes it possible to gather the plurality of flat cables into a single bundle, permitting easier control of components.

The transmission device of the present invention is not limited to the aforementioned first embodiment and its variations and the second through sixth embodiments, but may be modified in various manners.

In the embodiments discussed above, the present invention is applied to the steering system of a vehicle, however, this invention is applicable to various transmission devices used to perform transmission between two relatively rotatable components. In addition, the transmission device according to the present invention is not limited to the purpose of the transmission of electrical signals but it can be also used for transmitting optical signals, or transmitting both optical signals and electrical signals. In this case, a transmission cable, which includes optical fibers or combines optical fibers and electric conductors is used in place of the transmission cable which includes electric conductors.

Further, the frictional resistance of the cable surface may be increased to prevent cable slack which is caused by the relative rotation of the inner and outer cases. More specifically, if a flat cable comprising tape-shaped conductors held between plastic films is used, the flat cable tends to incur slippage between the inner and outer layers when the flat cable is spirally wound with the windings contacting one another. This prevents the rotary force of the inner case from being adequately transmitted to the cable winding direction reversal section. As a result, the reversing section becomes a fixed point and the flat cable located between the reversing section and the inner case unwinds and loosens, possibly interfering with the rotation of the case. To avoid this problem, the frictional resistance of the flat cable surface is increased to prevent the slippage of the flat cable whose inner and outer layers contact one another.

Figure 18:
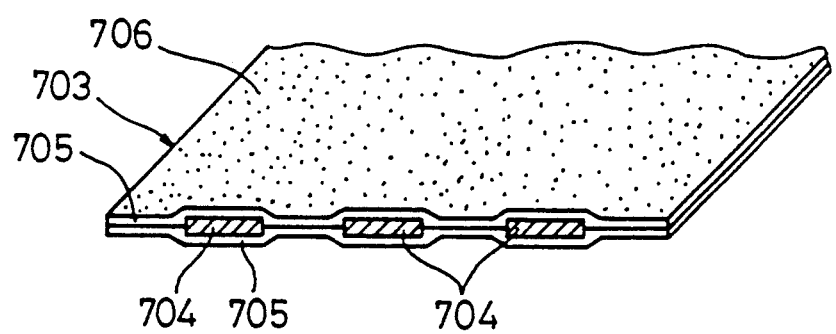
FIG. 18 is a fragmentary perspective view which shows, partly in cross section, a variation of the flat cable.

To be more specific as illustrated in FIG. 18, an adhesive 706 with weak adhesion is applied to the surface of the flat cable 703 which comprises of tape-shaped conductors 704 held between plastic films 705. With the adhesive 703 applied, the inner and outer layers of the flat cable 703 which contact with one another develop a slightly adhesive condition. As a result, even when the inner case is rotated, slippage does not occur between the contacting cable portions, and therefore, the rotary force of the inner case can be transmitted to the cable winding direction reversal section, thus making it possible for the cable to be securely wound onto the outer case. At this time, the cable wound on the inner case is gradually peeled, but the adhesion of the adhesive 706 is weak, so that no larger force is required to peel the cable, causing no interference with the rotation of the inner case.

Alternative means are available other than applying an adhesive urethane rubber sheets or the like may be applied to the plastic film surfaces, the film surfaces may be subject to a hair plantation process, uneven film surfaces may be used, or urethane rubber sheets may be used instead of films. Alternatively a viscous fluid having low viscosity such as grease may be applied to the film surfaces. The viscous fluid applied causes adjacent flat cable layers to slightly adhere to each other. The viscous fluid also serves as a cushion in case of a collision, thereby preventing noises from being produced even if the cable is subjected to vibration.

What is claimed is:

1. A transmission device comprising:
an inner case and an outer case which are rotatable relative to each other, and which are coupled together to define a space therebetween for receiving a transmission medium which is spirally wound and housed in said space defined by said inner case and said outer case;
a plurality of flexible cables provided in said space defined by said inner case and said outer case;
said plurality of flexible cables including at least one spirally wound transmission cable serving as said spirally wound transmission medium;
each of said plurality of flexible cables having inner and outer ends fixed to said inner case and to said outer case, respectively;

each of said plurality of flexible cables having inner and outer end sections, said inner and outer end sections normally extending in opposite directions from each other circumferentially around said inner and outer case, so that a direction reversal section at which cable movement reverses is formed in said space defined by said inner and outer cases;

said direction reversal sections of said plurality of flexible cables being spaced at mutually equal angular intervals circumferentially around the whole circumferential extent of said inner and outer cases; and each of said direction reversal sections generating an elastic reaction force for pressing the inner end section of at least one counterpart of said plurality of flexible cables, and also generating an elastic reaction force for pressing the outer end section of at least one counterpart of said plurality of flexible cables.

2. The transmission device according to claim 1, wherein:
said inner case has a drum section;
said outer case has a cylindrical section which is provided coaxially with the drum section of said inner case; and
said plurality of flexible cables are arranged so that their respective inner end sections are wrapped around the drum section of said inner case so as to overlap one another, and so that their outer end sections extend circumferentially along an inner surface of said cylindrical section of said outer case so as to overlap one another, as said inner and outer cases rotate relative to each other.

3. The transmission device according to claim 1, wherein:
said inner case comprises a plate-form member, and
said plurality of flexible cables are arranged so that their inner end sections are wound and overlapped with one another, and so that their outer end sections are wound and overlapped with one another.

4. The transmission device according to claim 1, wherein said at least one transmission cable included in said plurality of flexible cables comprises a band transmission cable which includes a plurality of transmission lines.

5. The transmission device according to claim 1, wherein each of said plurality of flexible cables comprises a transmission cable.

6. The transmission device according to claim 1, wherein each of said transmission cables comprises a single covered transmission line.

7. The transmission device according to claim 6, wherein:
said plurality of flexible cables include a plurality of transmission cables each comprising a single covered transmission line; and
said plurality of transmission cables are formed into a bundle at both ends and are separated from one another in a remainder section intermediate the ends thereof.

8. The transmission device according to claim 1, further comprising:
a plurality of inside connection terminals for connecting said transmission cables provided in said space to external equipment on the inner case side; and
a plurality of outside connection terminals for connecting said transmission cables provided in said space to external equipment on the outer case side; and wherein the inner end of each of said transmission cables is connected to a corresponding one of said plurality of inside connection terminals, and the outer end of each of said transmission cables is connected to a corresponding one of said plurality of outside connection terminals.

9. The transmission device according to claim 8, wherein:
said plurality of inside connection terminals are arranged at a predetermined part of said inner case to form an inner connector member for connecting said transmission cables to the external equipment on said inner case side; and
said plurality of outside connection terminals are arranged at a predetermined part of said outer case to form an outer connector member for connecting said transmission cables to the external equipment on said outer case side.

10. The transmission device according to claim 8, wherein:
said plurality of inside connection terminals are spaced at intervals circumferentially around said inner case; and
said plurality of outside connection terminals are spaced at intervals circumferentially around said outer case.

11. The transmission device according to claim 10, further comprising:
a plurality of inside wires formed on said inner case; and
a plurality of outside wires formed on said outer case; and wherein:
ends on one side of said plurality of inside wires are connected to said plurality of inside connection terminals, and ends on the other side of said plurality of inside wires are gathered and connected to the external equipment on said inner case side; and
ends on one side of said plurality of outside wires are connected to said plurality of outside connection terminals, and ends on the other side of said plurality of outside wires are gathered and connected to the external equipment on said outer case side.

12. A transmission device comprising:
an inner case and an outer case which are rotatable relative to each other, and which are coupled together to define a space therebetween for receiving a transmission medium which is spirally wound and housed in said space defined by said inner case and said outer case;
a plurality of flexible cables provided in said space defined by said inner case and said outer case;
said plurality of flexible cables including at least one spirally wound transmission cable serving as said spirally wound transmission medium;
each of said plurality of flexible cables having inner and outer ends fixed to said inner case and to said outer case, respectively;
each of said plurality of flexible cables having inner and outer end sections, said inner and outer end sections normally extending in opposite directions from each other circumferentially around said inner and outer case, so that a direction reversal section at which cable movement reverses is formed in said space defined by said inner and outer cases;

said direction reversal sections of said plurality of flexible cables being spaced at intervals circumferentially around said inner and outer cases; and wherein said plurality of flexible cables includes at least one dummy cable.

13. A transmission device comprising:

an inner case and an outer case which are rotatable relative to each other, and which are coupled together to define a space therebetween for receiving a transmission medium which is spirally wound and housed in said space defined by said inner case and said outer case;

a plurality of flexible cables provided in said space defined by said inner case and said outer case;

said plurality of flexible cables including at least one spirally wound transmission cable serving as said spirally wound transmission medium;

each of said plurality of flexible cables having inner and outer ends fixed to said inner case and to said outer case, respectively;

each of said plurality of flexible cables having inner and outer end sections, said inner and outer end sections normally extending in opposite directions from each other circumferentially around said inner and outer cases, so that a direction reversal section at which cable movement reverses is formed in said space defined by said inner and outer cases;

said direction reversal sections of said plurality of flexible cables being spaced at intervals circumferentially around said inner and outer cases; and said plurality of flexible cables including:

a plurality of transmission cables each including a single bare transmission line, and a plurality of insulated cables each including an insulator, each of said plurality of insulated cables being provided between corresponding adjacent ones of said plurality of transmission cables.

14. The transmission device according to claim 3, further comprising:

a plurality of inside connection terminals for connecting said transmission cables provided in said space to external equipment on the inner case side; and a plurality of outside connection terminals for connecting said transmission cables provided in said space to external equipment on the outer case side; and wherein the inner end of each of said transmission cables is connected to a corresponding one of said plurality of inside connection terminals, and the outer end of each of said transmission cables is connected to a corresponding one of said plurality of outside connection terminals.

15. The transmission device according to claim 14, wherein:

said plurality of inside connection terminals are arranged at a predetermined part of said inner case to form an inner connector member for connecting said transmission cables to the external equipment on said inner case side; and said plurality of outside connection terminals are arranged at a predetermined part of said outer case to form an outer connector member for connecting said transmission cables to the external equipment on said outer case side.

16. The transmission device according to claim 14, wherein:

said plurality of inside connection terminals are spaced at intervals circumferentially around said inner case; and said plurality of outside connection terminals are spaced at intervals circumferentially around said outer case.

17. The transmission device according to claim 16, further comprising:

a plurality of inside wires formed on said inner case; and a plurality of outside wires formed on said outer case; and wherein:

ends on one side of said plurality of inside wires are connected to said plurality of inside connection terminals, and ends on the other side of said plurality of inside wires are gathered and connected to the external equipment on said inner case side; and ends on one side of said plurality of outside wires are connected to said plurality of outside connection terminals, and ends on the other side of said plurality of outside wires are gathered and connected to the external equipment on said outer case side.

18. A transmission device comprising:

an inner case and an outer case which are rotatable relative to each other, and which are coupled together to define a space therebetween for receiving a transmission medium which is spirally wound and housed in said space defined by said inner case and said outer case;

a plurality of flexible cables provided in said space defined by said inner case and said outer case;

said plurality of flexible cables including at least one spirally wound transmission cable serving as said spirally wound transmission medium;

each of said plurality of flexible cables having inner and outer ends fixed to said inner case and to said outer case, respectively;

each of said plurality of flexible cables having inner and outer end sections, said inner and outer end sections normally extending in opposite directions from each other circumferentially around said inner and outer cases, so that a direction reversal section at which cable movement reverses is formed in said space defined by said inner and outer cases;

said direction reversal sections of said plurality of flexible cables being spaced at mutually equal angular intervals circumferentially around the whole circumferential extent of said inner and outer cases; and wherein:

said inner case has a drum section;

said outer case has a cylindrical section which is provided coaxially with the drum section of said inner case; and said plurality of flexible cables are arranged so that their respective inner end sections are wrapped around the drum section of said inner case so as to overlap one another, and so that their outer end sections extend circumferentially along an inner surface of said cylindrical section of said outer case so as to overlap one another, as said inner and outer cases rotate relative to each other;

said drum section of said inner case has a plurality of inner slits therein, through which said inner ends of said plurality of flexible cables are passed; and said cylindrical section of said outer case has a plurality of outer slits therein, through which said outer ends of said plurality of flexible cables are passed.

19. A transmission device comprising:

an inner case and an outer case which are rotatable relative to each other, and which are coupled together to define a space therebetween for receiving a transmission medium which is spirally wound and housed in said space defined by said inner case and said outer case;

a plurality of flexible cables provided in said space defined by said inner case and said outer case;

said plurality of flexible cables including at least one spirally wound transmission cable serving as said spirally wound transmission medium;

each of said plurality of flexible cables having inner and outer ends fixed to said inner case and to said outer case, respectively;

each of said plurality of flexible cables having inner and outer end sections, said inner and outer end sections normally extending in opposite directions from each other circumferentially around said inner and outer cases, so that a direction reversal section at which cable movement reverses is formed in said space defined by said inner and outer cases;

said direction reversal sections of said plurality of flexible cables being spaced at intervals circumferentially around said inner and outer cases; and wherein:

said inner case has a drum section;

said outer case has a cylindrical section which is provided coaxially with the drum section of said inner case; and said plurality of flexible cables are arranged so that their respective inner end sections are wrapped around the drum section of said inner case so as to overlap one another, and so that their outer end sections extend circumferentially along an inner surface of said cylindrical section of said outer case so as to overlap one another, as said inner and outer cases rotate relative to each other;

said drum section of said inner case has a plurality of inner slits therein, through which said inner ends of said plurality of flexible cables are passed; and said cylindrical section of said outer case has a plurality of outer slits therein, through which said outer ends of said plurality of flexible cables are passed; and wherein grooves for receiving bent parts of the cables are formed in the vicinity of those areas where said slits are formed in said inner case drum section and said outer case cylindrical section, said bent parts being formed at said inner ends or said outer ends of said cables when said inner and outer cases begin further relative rotation from their ultimate relative rotation position, or from their neutral relative rotation position.

* * * * *